United States Patent

Tong et al.

[11] Patent Number: 5,982,435
[45] Date of Patent: Nov. 9, 1999

[54] METHOD AND APPARATUS FOR ENCODING IMAGE, METHOD AND APPARATUS FOR DECODING IMAGE, AND MEDIUM FOR RECORDING IMAGE SIGNAL

[75] Inventors: Tak Yen Tong, Tokyo; Masami Ogata, Kanagawa; Teruhiko Suzuki, Chiba; Nobuyoshi Miyahara, Kanagawa, all of Japan

[73] Assignee: Sony Corporation, Tokyo, Japan

[21] Appl. No.: 08/881,142

[22] Filed: Jun. 24, 1997

[30] Foreign Application Priority Data

Jul. 1, 1996 [JP] Japan ..................................... 8-171451

[51] Int. Cl.$^6$ ...................................................... H04N 7/12
[52] U.S. Cl. ........................... 348/398; 348/401; 348/403; 382/248
[58] Field of Search .................................. 348/398, 401, 348/403, 404, 407, 408, 399, 390, 384, 397; 382/240, 233, 232, 238, 248, 249, 250; H04N 7/12

[56] References Cited

U.S. PATENT DOCUMENTS

| 5,398,067 | 3/1995 | Sakamoto | 348/403 |
| 5,420,636 | 5/1995 | Kojima | 348/403 |
| 5,477,272 | 12/1995 | Zhang et al. | 348/407 |
| 5,495,292 | 2/1996 | Zhang et al. | 348/407 |
| 5,764,805 | 6/1998 | Martucci et al. | 382/238 |
| 5,825,935 | 10/1998 | Murakoshi | 382/248 |

Primary Examiner—Bryan Tung
Assistant Examiner—Tung Vo
Attorney, Agent, or Firm—Frommer Lawrence & Haug, LLP; William S. Frommer

[57] ABSTRACT

An image encoding method and apparatus, an image decoding method and apparatus, and an image recording medium are provided for suppress the diffusion of the quantizing noise components of the wavelet coefficient or the subband coefficient caused by the band division with the wavelet filter or the subband filter and the quantization, thereby narrowing the area where the ringing takes place. The image encoding method is arranged to detect a motion vector from an input image signal, derive a difference between the input image signal and a predicted image signal, detect a meaningless area from the difference image signal and output information about the meaningless area; subband-convert the difference image signal for outputting a subband coefficient, quantize the subband coefficient, de-quantize the quantized subband coefficient, invert the decoded subband coefficient for outputting a decoded difference image signal, smooth the decoded difference image signal based on the information about the meaningless area, add the predicted image signal to the smoothed difference image signal for producing a decoded image signal, motion-compensate the decoded image signal with the motion vector for outputting the predicted image signal, and output the quantized subband coefficient, the information about the meaningless area, and the motion vector as encoded data. The decoding method takes the substantially reverse operation as the encoding method.

34 Claims, 13 Drawing Sheets

METHOD AND APPARATUS FOR ENCODING IMAGE, METHOD AND APPARATUS FOR DECODING IMAGE, AND MEDIUM FOR RECORDING IMAGE SIGNAL

BACKGROUND OF THE INVENTION

1. Field of the Invention

The present invention relates to a method and an apparatus for encoding an image, a medium for recording an image signal, as well as a method and an apparatus for decoding an image, and more particularly to a system arranged to convert an image signal of a moving picture into storage codes and record the corresponding storage codes on an image recording medium such as an optical disk, a magnetic disk or a magnetic tape as well as a method and an apparatus for encoding an image, an image signal recording medium, and a method and an apparatus for decoding an image which can be all used in a system for transmitting an image signal of a moving picture through a transmission path.

2. Description of the Related Art

As one of the encoding/decoding systems for the purpose of compressing a digital signal, there has been proposed such a sort of method as being arranged on a band division caused by a wavelet filter or a subband filter. This sort of method is arranged to perform a plurality of filtering operations having respective passage bands with respect to an inputted signal, sub-sample the filtered signal at intervals corresponding to the band widths. The shift of energy of the output signal from each filter is used for compressing an image.

FIG. 1 shows a basic arrangement for band division and synthesis based on the wavelet filter or the subband filter. Herein, an input signal is a one-dimensional signal x [i].

In FIG. 1, a numeral 300 denotes a divider, which provides an analytic lowpass filter 301 for dividing a band and an analytic highpass filter 302 for dividing a band. These two filters 301 and 302 are served to divide the input signal into a low frequency band signal XL[i] and a high frequency band signal XH[i]. Numerals 330A and 330B denote subsamplers, which operate to perform a thinning operation at a sample unit as indicated in the following expressions (1) and (2) with respect to the band-divided signals XL[i] and XH[i].

$$XL[j]=XL[i], j=i/2 \qquad (1)$$

$$XH[j]=XH[i], j=i/2 \qquad (2)$$

A numeral 400 denotes a synthesizer, which provides up-samplers 431A and 431B, a synthesizing lowpass filter 411, a synthesizing highpass filter 412, and an adder 436. In operation, the up-samplers 431A and 431B are served to double a sampling interval in length and insert a sample with a zero value at a center of the sampling interval as indicated in the following expressions (3) and (4).

$$XL[j] = \begin{cases} XL[i] & \cdots i = 2 \times j \\ 0 & \cdots i = 2 \times j + 1 \end{cases} \qquad (3)$$

$$HL[j] = \begin{cases} HL[i] & \cdots i = 2 \times j \\ 0 & \cdots i = 2 \times j + 1 \end{cases} \qquad (4)$$

The synthesizing lowpass filter 411 and the synthesizing highpass filter 412 perform an interpolation with respect to the band signals XL[i] and XH[i]. The interpolated signals are added through the adder 436 for restoring the input signal x[i].

The analytic lowpass filter 301 and the analytic highpass filter 302 located in the divider 300 and the synthesizing lowpass filter 411 and the synthesizing highpass filter 412 located in the synthesizer 400 are all composed to fully or approximately meet the relations of the following expressions (5) and (6).

$$H_0(-z)F_0(z)+H_1(-z)F_1(z)=0 \qquad (5)$$

$$H_0(z)F_0(z)+H_1(z)F_1(z)=2z^{-L} \qquad (6)$$

$H_0(z)$, $H_1(z)$, $F_0(z)$, and $F_1(z)$ are transfer functions for the analytic lowpass filter 301, the analytic highpass filter 302, the synthesizing lowpass filter 411, and the synthesizing highpass filter 412, respectively. L is any integer. This constraint condition guarantees that the output signal X"[i] from the adder 436 located in the synthesizer 400 completely or approximately coincides with the input signal x[i].

In the case of applying the foregoing band division or synthesis based on the wavelet filter or the subband filter to an encoding operation, the encode/decode process is executed between the subsamplers 330A and 330B and the up-samplers 431A and 431B, respectively. The arrangement shown in FIG. 1 divides the input signal into two bands. In actual, for encoding for the purpose of data compression, each band may be recursively divided twice or three times for achieving more efficient compression.

FIGS. 2 and 3 show the band division and synthesis based on the wavelet filter and the band division and synthesis based on the subband filter.

In FIG. 2, a numeral 500 denotes an encoder for dividing a band through the wavelet filter. In the encoder 500, an analytic lowpass filter 501A and an analytic highpass filter 502A are served to divide the input signal x[i] into a low frequency band XL0[i] and a high frequency band XH0[i]. Then, the low frequency band signal XL0[j], which is subsampled like the operation of the expression (1) by a subsampler 530A, is further band-divided through a second analytic lowpass filter 501B and a second analytic highpass filter 502B and then is subsampled by subsamplers 530C and 530D.

On the other hand, the high frequency band signal XH0[i] passed through the analytic highpass filter 502A at a first stage is subsampled by the subsampler 530B and then is applied into a delaying unit 537 for taking synchronization with the low frequency band signal. The first-stage high frequency band signal XH0[j] delayed by the delaying unit 537 and the high frequency band signal XH1[k] and the low frequency band signal XL1[k] sabsampled by the second-stage subsamplers 530C and 530D are applied to the corresponding quantizers 532A, 532B and 532C. Those signals are quantized at the quantizing steps QHO, QH1 and QL1 according to the following expressions (7), (8) and (9).

$$XL1'[k] = \frac{XL1[k]}{QL1} \qquad (7)$$

$$XH1'[k] = \frac{XH1[k]}{QH1} \qquad (8)$$

$$XH0'[j] = \frac{XH0[j]}{QH0} \qquad (9)$$

The quantized data XL1'[k], XH1'[k], and XH0'[j] are then applied into a reversible encoder/multiplexer 534, in which the reversible encoding such as the Huffman coding or the arithmetic coding as usual and the multiplexing are executed with respect to the quantized data. Then, the results are sent to a decoder 600 shown in FIG.3 through a storage medium 535 and a transmission path 536.

In FIG. 3, the decoder generally indicated at 600 performs a wavelet synthesis. In the decoder 600, a de-multiplexer/reversible decoder 635 performs a decoding process against the multiplexing and the reversible encoding executed in the encoder 500 for restoring the data XL1'[k], XH1'[k], and XH0'[j]. The restored data XL1'[k], XH1'[k], and XH0'[j] are applied to the corresponding de-quantizers 633A, 633B and 633C. Those de-quantizers 633A, 633B and 633C perform the reverse conversion to the quantizers 432A, 432B and 432C. The reverse conversions of the de-quantizers correspond to the expressions (10), (11) and (12), respectively.

$$XL1''[k] = XL1'[k] \times QL1 \qquad (10)$$

$$XH1''[k] = XH1'[k] \times QH1 \qquad (11)$$

$$XH0''[j] = XH0'[j] \times QH0 \qquad (12)$$

The low frequency band signal XL1"[k] and the high frequency band signal XH1"[k] derived at the second stage division are applied into the up-samplers 631A and 631B. The high frequency band signal XH0"[j] at the first stage division is applied into a delaying unit 637 for delaying the signal by a time required for re-composing the low frequency band signal XL0"[j] at the first stage division.

The low frequency band signal XL1"[j] and the high frequency signal XH1"[j], which are subject to the same up-sampling process as the expressions (3) and (4) by the up-samplers 631A and 631B, are applied into synthesizing lowpass filer 611A and synthesizing highpass filter 612A that have the relations of the expressions (5) and (6) with the analytic lowpass filter 501B and the analytic highpass filter 502B, respectively. The outputs of the filters 611A and 612A are applied into an adder 636A for adding them. Then, the added result is made to be the signal XL0"[j] corresponding to the low frequency band signal XL0[j] obtained by the first-stage division in the encoder 500.

The first-stage low frequency band signal XL0"[j] and the first-stage high frequency band signal XH0"[j] delayed by the delayer 637 are up-sampled by the up-samplers 631C and 631D, respectively. The up-sampled signals are interpolated through the effect of the synthesizing lowpass filter 611B and the synthesizing highpass filter 612B and then are added to one signal by an adder 636B. The added signal is made to be a regenerative signal x"[i] corresponding to the input signal x[i].

In turn, the description will be oriented to an apparatus for encoding a moving image through the wavelet conversion and an apparatus for decoding a moving image therethrough with reference to FIGS. 4 and 5.

In an encoder generally indicated at 700 in FIG. 4, a motion vector detector 711 operates to detect a motion vector v from the input image stored in a frame memory 712. The method for detecting a motion vector normally employs a block matching system at a block unit consisting of 16×16 pixels in vertical and horizontal. In place, for realizing higher precision, the matching at a half-pixel unit may be employed.

A numeral 703 denotes a motion compensator provided with a frame memory (not shown). The motion compensator 703 operates to predict a pixel value at each location of an image to be encoded based on the images which have been already encoded and decoded and then stored in the frame memory. The predicted value I'[i, j, t] of the pixel value I[i, j, t] at the location (i, j) on the image inputted at a time point t is determined by the following expression (13) using the motion vector v−(vx(i, j, t), vy(i, j, t)) at that location.

$$I'[i, j, t] = (I[i', j', t-T] + \qquad (13)$$
$$I[i'+1, j', t-T] +$$
$$I[i', j'+1, t-T] +$$
$$I[i'+1, j'+1, t-T])/4$$

$$i'' = int(i + vx(i, j, t)T)$$
$$j'' = int(j + vy(i, j, t)T)$$

wherein T denotes a difference between a time point when the image I being currently predicted and a time point when the image on the frame memory is inputted. The right side of the expression (13), I[i', j', t−T], I[i'+1, j', t−T], I[i', j'+1, t−T], and I[i'+1, j'+1, t−T], represents the pixel value on the frame memory (not shown). int(x) represents a maximum integer value that does not exceed x.

A numeral 790 denotes a subtracter, which operates to calculate a difference between a value of a pixel to be encoded and a predicted value calculated by the motion compensator 703. A wavelet converter 714 performs a wavelet conversion with respect to the difference calculated by the subtracter 790. A quantizer 715 performs a quantizing process as indicated in the following expression (14) using a proper step size Q with respect to a wavelet coefficient c obtained by the wavelet converter 714.

$$c' = int(c/Q) \qquad (14)$$

The wavelet coefficient quantized by the quantizer 715 is supplied to a variable-length encoder 716 and a de-quantizer 725. The de-quantizer 725 performs a de-quantizing process as indicated in the following expression (15) using the same step size as that used in the quantizer 715.

$$c'' = c' \times Q \qquad (5)$$

The de-quantized data is applied into a wavelet inverter 724, where the data is de-waveletted for restoring the difference between the pixel values. The difference value is added to the predicted value outputted from the motion compensator 703 by an adder 791 for composing the data of the pixel value. Then, the pixel value data is sent to the motion compensator 703 in which the data is stored in the frame memory (not shown). The variable-length encoder 716 performs a variable-length encoding operation with respect to the wavelet coefficient quantized by the quantizer 715 and the motion vector v detected by the motion vector detector 711. The encoded data is outputted as a bit stream. Then, the bit stream is transmitted to the decoder 800 shown in FIG. 5 through a storage medium 726 and a transmission path 727.

On the other hand, FIG. 5 shows a decoder generally indicated at 800. The decoder 800 receives the bit stream generated by the encoder 700. At first, the bit stream is applied into a variable-length decoder 826 in which the reverse process to the variable-length encoder 716 included in the encoder 700 is performed with respect to the bit stream. The inversion makes it possible to restore the quantized wavelet coefficient and the quantized motion vector v from the bit stream. The wavelet coefficient is applied to a de-quantizer 825 and the motion vector v is applied to a motion compensator 803. The de-quantizer 825 and a wavelet inverter 824 are the same as those included in the encoder 700. The de-quantizer 825 and the wavelet inverter 824 perform the de-quantizing process and the wavelet inversion indicated in the expression (3) with respect to the inputted data for restoring each difference between the pixel values.

The difference is added to the predicted value generated by the motion compensator 803 for composing pixel value data by an adder 891, which leads to re-composition of the image corresponding to the image inputted to the encoder 700. Then, the re-composed image is outputted as a restored image. Each pixel value of the restored image is stored in a frame memory (not shown) provided in the motion compensator 803 for aiding in generating the predicted image.

The motion compensator 803 is the same as that included in the encoder 700. The motion compensator 803 operates to predict each pixel value of an image to be currently decoded by using the motion vector v obtained by the variable-length decoder 826 and the image stored in the frame memory (not shown) provided in the motion compensator 803. Then, each predicted pixel value is supplied to a subtracter 891.

The foregoing description concerns with the arrangement for the inter-coding operation. If a large difference takes place between a value of a pixel to be currently encoded and a predicted value given by the motion compensator 703, for preventing increase of an encoded bit quantity, the below-indicated intra-coding operation may be executed. That is, the operation is executed to send to the wavelet converter the value derived by subtracting an average value (average offset value) of luminance values in one block from each pixel in the block as a difference image and send the average value of the luminance value (average offset value) to the variable-length encoder 716 in place of the motion vector.

The wavelet encoding system, in general, utilizes the grammar as indicated in FIGS. 6A and 6B for generating an encoded bit train (see a system diagram of multiplexing process). In addition, FIGS. 6A and 6B illustrate part of the process executed by the variable-length encoder 716. FIG. 6A shows the process for generating the encoded bit train, while FIG. 6B shows a process about the output of the motion vector or the average offset value. Though the discrete cosine conversion (DCT) used for the MPEG1 or MPEG2 is executed to calculate a conversion coefficient at a block unit, in general, the encoding system based on the wavelet conversion is executed to calculate a quantizing wavelet coefficient over the overall image in place of each block. Hence, as shown in FIG. 6A, about the image to be encoded, all the encoded vectors (for the inter-coding) or the average offset value (for the intra-coding) are outputted and then all the encoding wavelet coefficients are outputted. According to the grammar shown in FIG. 6B, about a unit block at which the motion vector is detected and the motion is compensated, at first, a flag indicating the number of vectors is outputted. Since the intra-block has no vector, for the intra-block, the average offset value corresponding to the dc component of the wavelet coefficient is outputted as motion information. If an inter-block has one or more vectors (two or more vectors are allowed in one block in some cases), the encoded vector derived by encoding the motion vector detected for the area is outputted as motion information.

In the encoding method based on the band division done by the wavelet filter or the band division done by the subband filter, the quantization after the wavelet conversion or the subband conversion brings about the quantizing noises mainly in the high frequency component, so that the image formed by doing the wavelet inversion or the subband inversion after the de-quantization may disadvantageously bring about a ringing phenomenon. In particular, when performing an intra-image prediction, though lots of still areas included in the difference image is meaningless, the influence of the subsampling caused by two or more divisions results in increasing taps in number relatively as the band division is repeated more and more. Hence, the meaning values around the moving area are diffused into the meaningless values of the still area, so that the ringing disadvantageously takes place in a wide area of the resulting image.

SUMMARY OF THE INVENTION

It is an object of the present invention to provide a method and an apparatus for encoding an image, an image signal recording medium, and a method and an apparatus for decoding an image which are arranged to suppress the diffusion of the quantizing noise components of the wavelet coefficient or the subband coefficient caused by the band division with the wavelet filter or the subband filter and the quantization, thereby narrowing the area where the ringing takes place.

The present invention is an apparatus for encoding an input image signal, including: means for detecting a motion vector from the input image signal; means for operating a difference between the input image signal and a predicted image signal and outputting a difference image signal; means for detecting a meaningless area from the difference image signal and outputting information indicating the meaningless area; means for doing a subband conversion of the difference image signal and outputting a subband coefficient; means for quantizing the subband coefficient and outputting the quantized subband coefficient; means for de-quantizing the quantized subband coefficient and outputting a decoded subband coefficient; means for doing a reverse subband conversion of the decoded subband coefficient and outputting a decoded difference image signal; means for smoothing the decoded difference image signal based on the information indicating the meaningless area and outputting a smoothed decoded difference image signal; means for adding the predicted image signal to the smoothed difference image signal and outputting a decoded image signal; means for motion-compensating the decoded image signal with the motion vector and outputting the predicted image signal; and means for outputting the quantized subband coefficient, the information indicating the meaningless area and the motion vector information as encoded data.

Also, the present invention is a method for encoding an input image signal, including the steps of: detecting a motion vector from the input image signal; operating a difference between the input image signal and a predicted image signal and outputting a difference image signal; detecting a meaningless area from the difference image signal and outputting information indicating the meaningless area; doing a subband conversion of the difference image signal and outputting a subband coefficient; quantizing the subband coefficient and outputting the quantized subband coefficient; de-quantizing the quantized subband coefficient and outputting a decoded subband coefficient; doing a reverse subband conversion of the decoded subband coefficient and outputting a decoded difference image signal; smoothing the decoded difference image signal based on the information indicating the meaningless area and outputting a smoothed decoded difference image signal; adding the predicted image signal to the smoothed difference image signal and outputting a decoded image signal; motion-compensating the decoded image signal with the motion vector and outputting the predicted image signal; and outputting the quantized subband coefficient, the information indicating the meaningless area, and the motion vector information as encoded data.

The present intention is an image decoding apparatus for receiving encoded data and decoding the encoded data, the encoded data containing a quantized subband coefficient information indicating a meaningless area, and motion vector information, including: means for de-quantizing the quantized subband coefficient and outputting a decoded subband coefficient; means for inverting the decoded subband coefficient and outputting a decoded difference image signal; means for smoothing the decoded difference image signal based on the information for indicating the meaningless area and outputting a smoothed decoded difference image signal; means for adding a predicted image signal to the smoothed difference image signal and outputting a decoded image signal; and means for motion-compensating the decoded image signal with the motion vector and outputting the predicted image signal.

Also, the present invention is an image decoding method for receiving encoded data and decoding the encoded data, the encoded data containing a quantized subband coefficient information indicating a meaningless area, and motion vector information, including the steps of: de-quantizing the quantized subband coefficient and outputting a decoded subband coefficient; inverting the decoded subband coefficient and outputting a decoded difference image signal; smoothing the decoded difference image signal based on the information for indicating the meaningless area and outputting a smoothed decoded difference image signal; adding a predicted image signal to the smoothed difference image signal and outputting a decoded image signal; and motion-compensating the decoded image signal with the motion vector and outputting the predicted image signal.

Also, the present invention is a recording medium to be decoded by a decoding apparatus, having encoded data, the encoded data containing a quantized subband coefficient, information indicating a meaningless area, and motion vector information, the encoded data generated by the steps of: detecting a motion vector from an input image signal; operating a difference between the input image signal and a predicted image signal and outputting the difference image signal; detecting a meaningless area from the difference image signal and outputting the information indicating the meaningless area; subband-convert the difference image signal and outputting a subband coefficient; quantizing the subband coefficient and outputting the quantized subband coefficient; de-quantizing the quantized subband coefficient and outputting a decoded subband coefficient; inverting the decoded subband coefficient for outputting a decoded difference image signal; smoothing the decoded difference image signal based on the information indicating the meaningless area and outputting a smoothed decoded difference image signal; adding the predicted image signal to the smoothed difference image signal, outputting a decoded image signal, motion-compensating the decoded image signal with the motion vector, and outputting the predicted image signal; and outputting the quantized subband coefficient, the information indicating the meaningless area, and the motion vector information as encoded data.

BRIEF DESCRIPTION OF THE DRAWINGS

This and other objects, features and advantages of the present invention will become more apparent upon a reading of the following detailed description and drawings, in which.

DETAILED DESCRIPTION OF THE PREFERRED EMBODIMENTS

Later, the description will be oriented to a method and an apparatus for encoding an image, an image signal recording medium, and a method and an apparatus for decoding an image according to preferred embodiments of the present invention with reference to the appended drawings.

Figure 1:
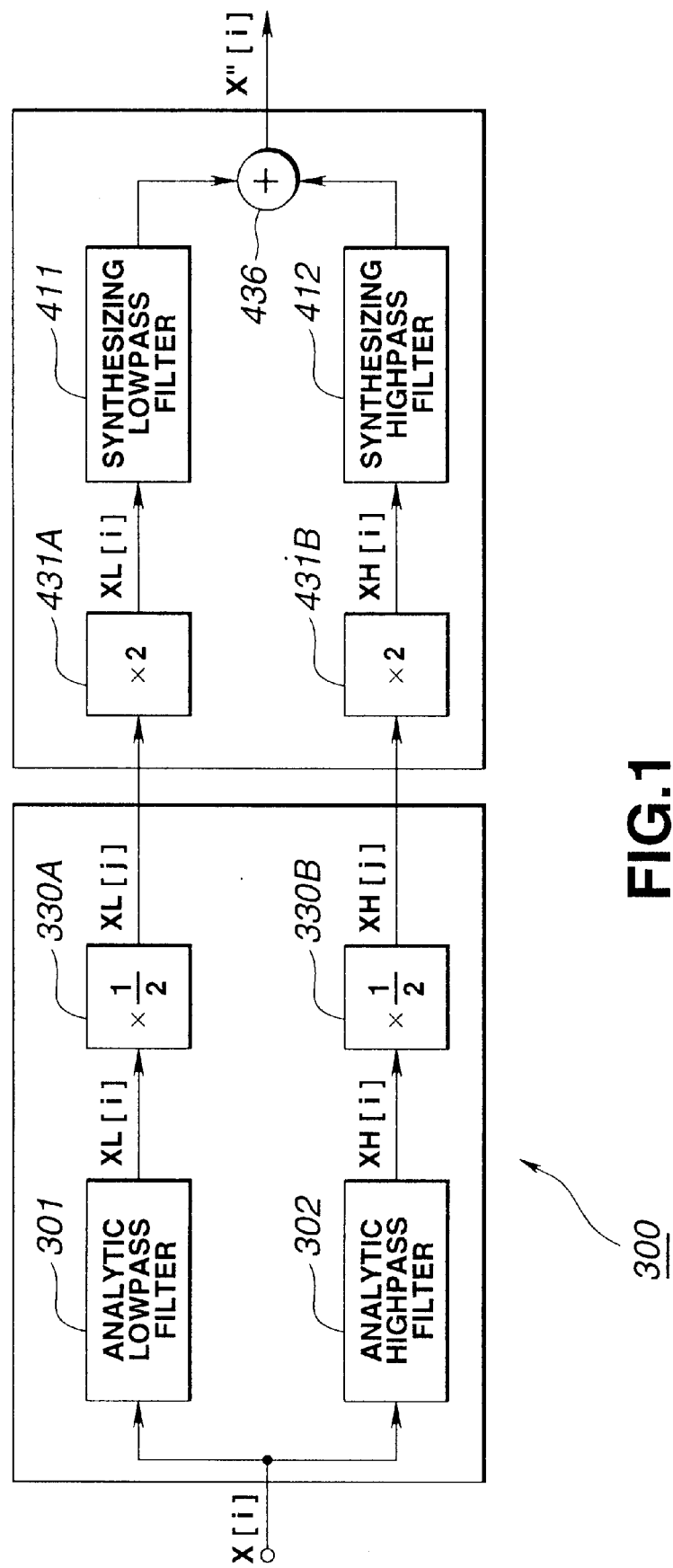
FIG. 1 is a block diagram showing a principle of wavelet division and synthesis.
Figure 2:
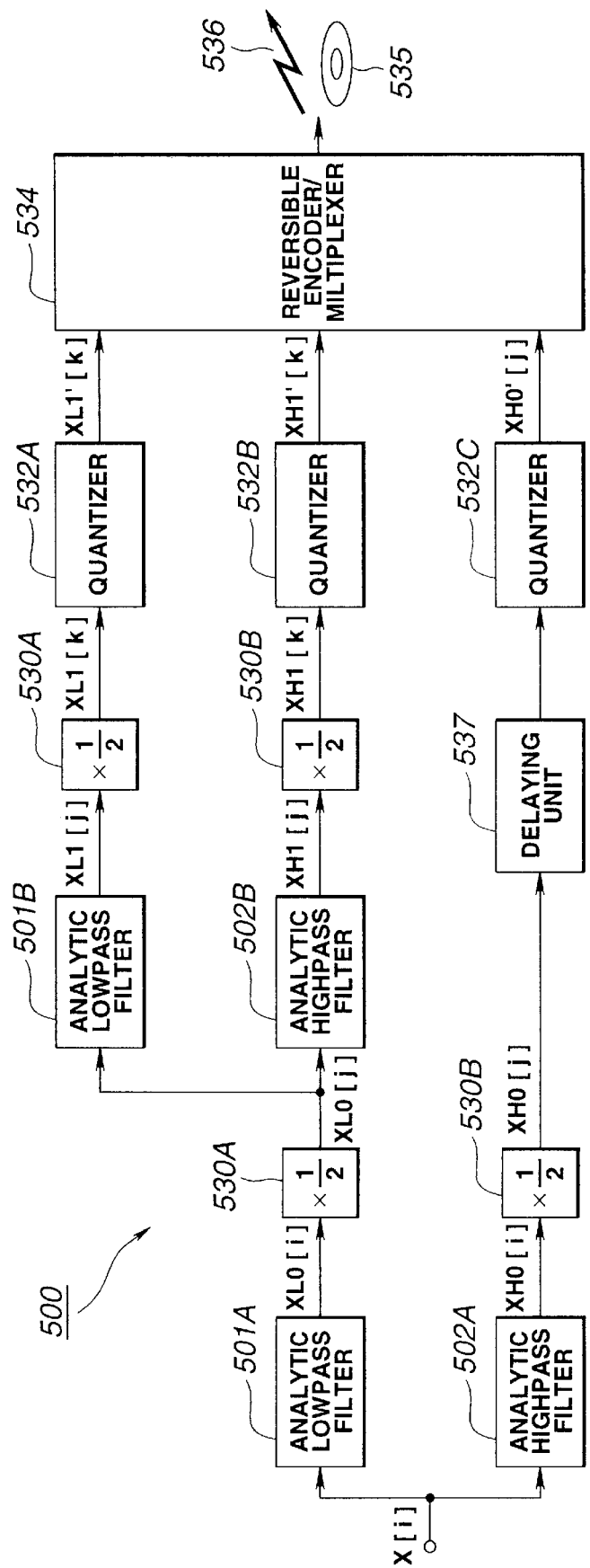
FIG. 2 is a block diagram showing a basic arrangement of a divider for doing the wavelet division.
Figure 3:
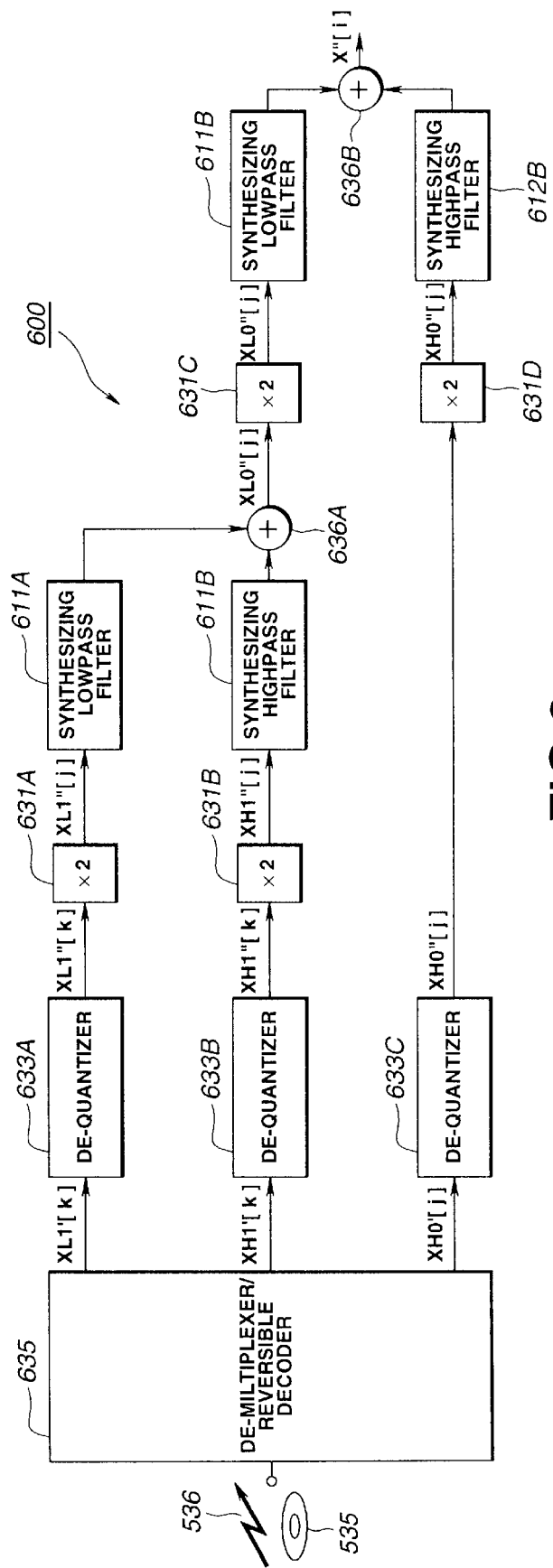
FIG. 3 is a block diagram showing a basic arrangement of a synthesizer for the wavelet synthesis.
Figure 4:
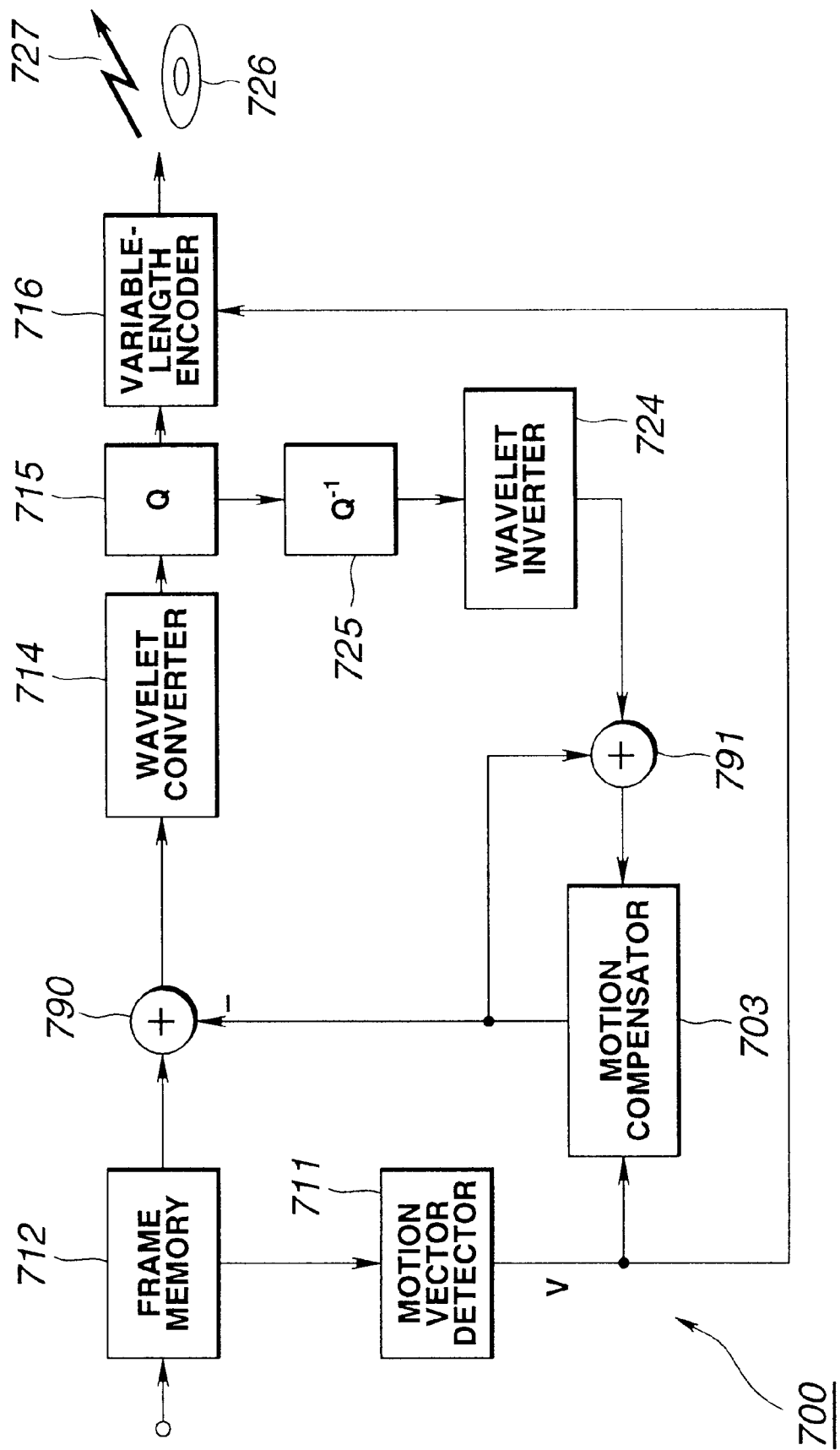
FIG. 4 is a block diagram showing an arrangement of an encoder for the wavelet division according to the present invention.
Figure 5:
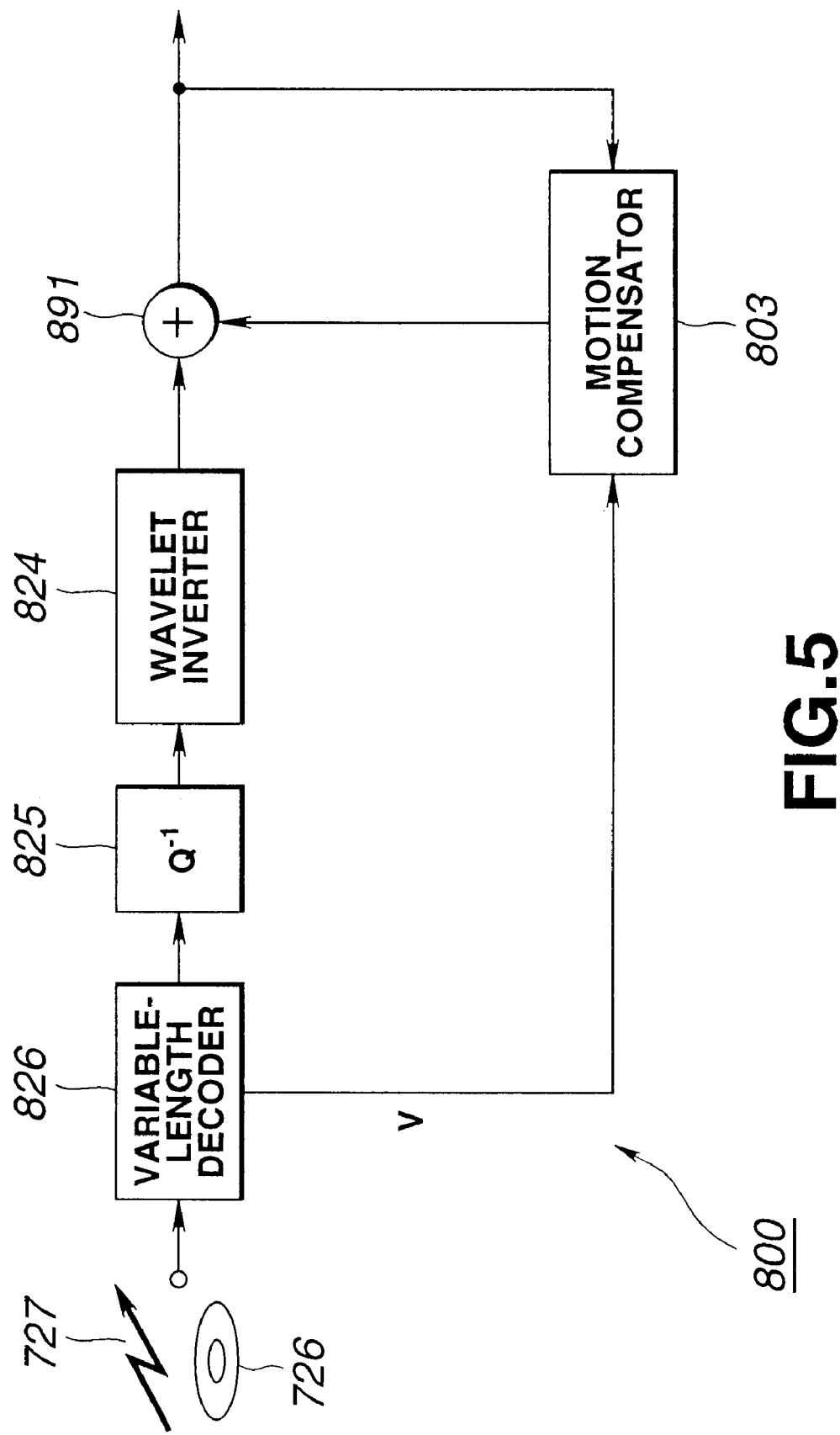
FIG. 5 is a block diagram showing an arrangement of a decoder for the wavelet synthesis according to the present invention.
Figure 7:
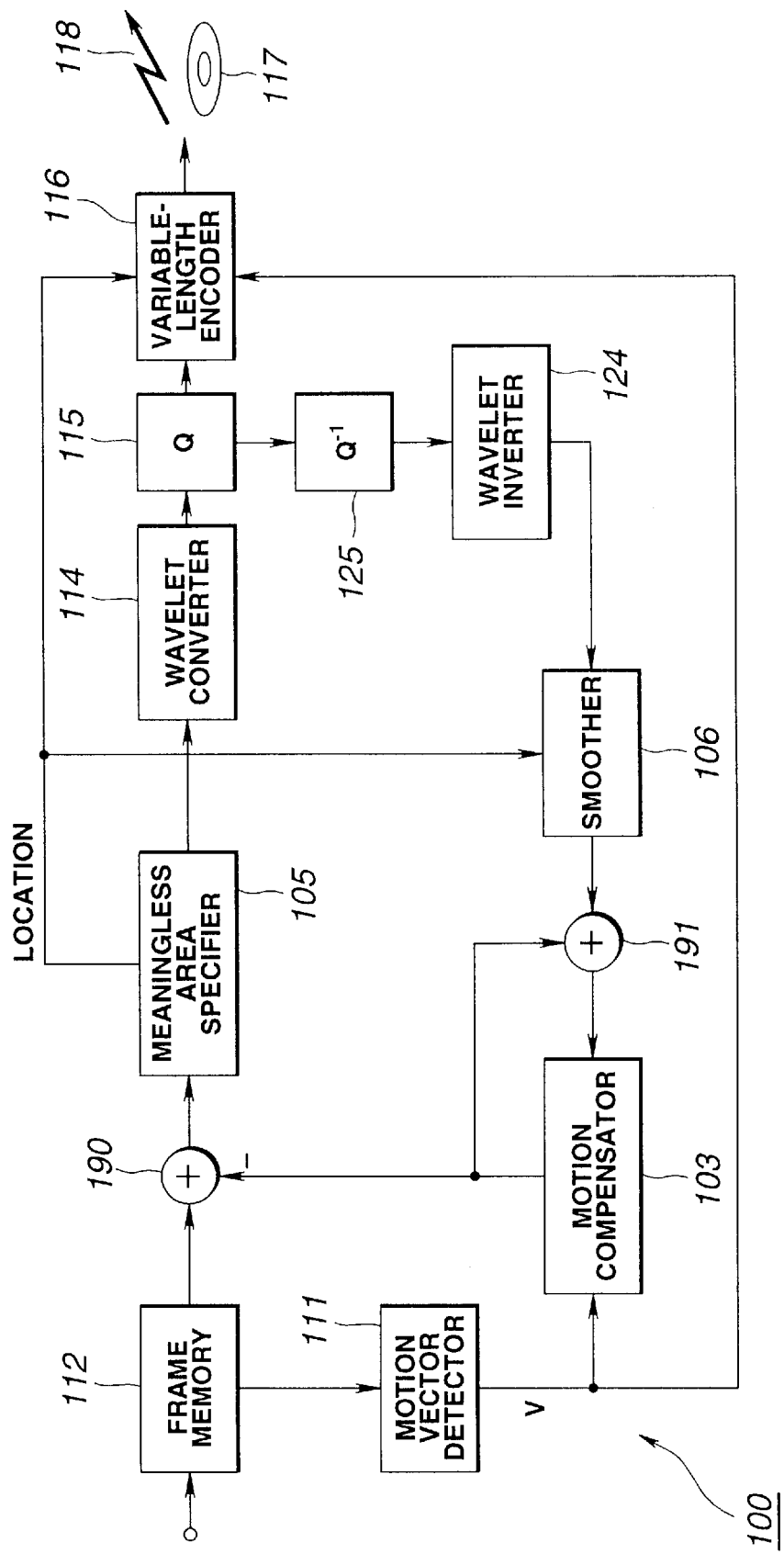
FIG. 7 is a block diagram showing an arrangement of an encoder for implementing a method for encoding an image according to the present invention.
Figure 8:
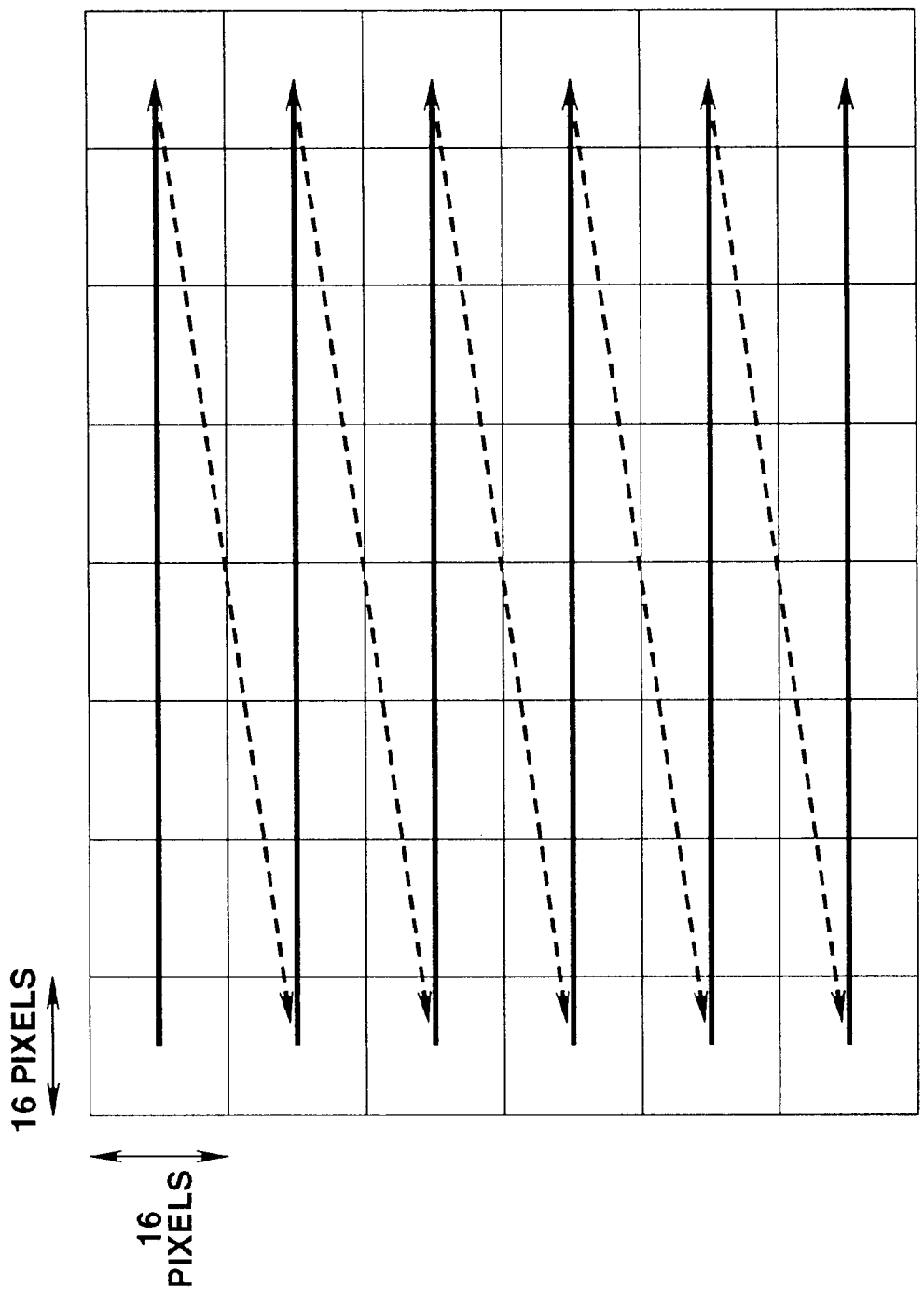
FIG. 8 is a chart showing block division and block scanning sequences of an image executed in the decoder.
Figure 9:
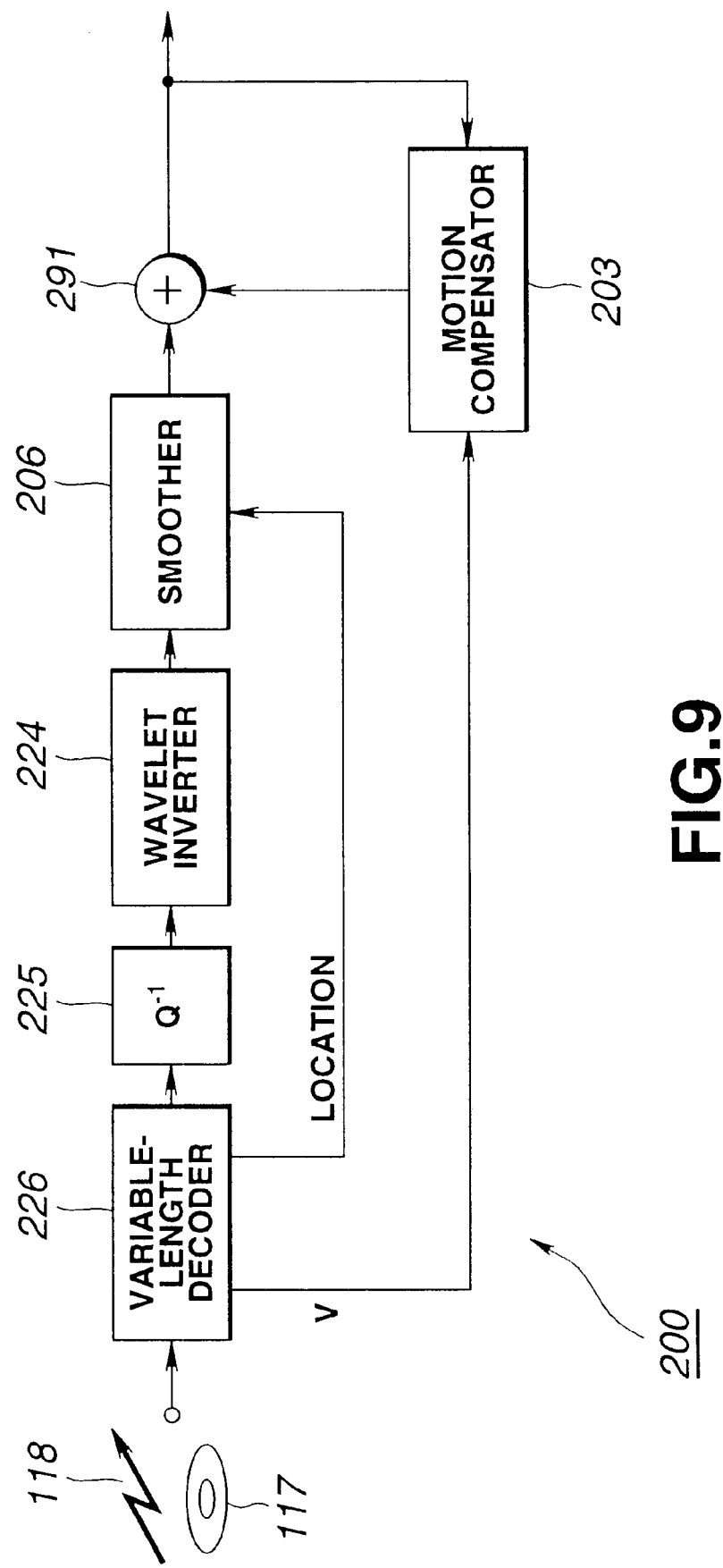
FIG. 9 is a block diagram showing an arrangement of a decoder according to the present invention.

The first embodiment of the invention shown in FIGS. 7 to 9 is an improvement of the encoding/decoding method and apparatus based on the wavelet conversion shown in FIGS. 4 and 5. The basic arrangement of this embodiment is substantially the same as the general arrangement shown in FIGS. 4 and 5 except that an encoder 100 includes a meaningless area specifier 105 located before a wavelet converter 14 and the encoder 100 and a decoder 200 include smoothers 106 and 206 after wavelet inverters 124 and 224, respectively. Hence, the description about the arrangement and the operation of the same part as the above is left out of here.

In the encoder 100 shown in FIG. 7, an input image is supplied to a frame memory 112 in which the image is stored. A motion vector detector 111 operates to detect a motion vector v from the input image stored in the memory frame 112. The method of detecting the motion vector employs the block matching at a block unit consisting of 16×16 pixels in vertical and horizontal. For realizing higher precision, the matching at a half-pixel unit may be used. A motion compensator 103 provides a frame memory (not shown). The pixel value of each location of an image to be currently encoded is predicted from the previous images that have been already encoded and decoded and stored in the frame memory. Then, a subtracter 190 operates to calculate a difference between the value of the pixel to be currently encoded and the predicted value calculated by the motion compensator 103.

In a case that the input to the meaningless area specifier 105 is a difference image, that is, the difference value calculated by the subtracter 190 is inputted to the meaningless area specifier 105, the meaningless area specifier 105 operates to detect the meaningless area from the difference value and send the location information LOCATION to the smoother 106 and the variable-length encoder 116.

The meaningless area specifier 105 operates to specify the following meaningless area, for example. At first, the inputted difference image is divided into blocks, each of which consists of 16×16 pixels in vertical and horizontal as shown in FIG. 8. Each block is used as the same one as that used when detecting the motion vector, for example. Then, about each block, an absolute value sum or a square sum of the difference values is calculated as indicated in the following expression (16).

$$\text{sum} = \sum_{i,j \in BS} |X_{i,j}| \tag{16}$$

or $$\text{sum} = \sum_{i,j \in BS} |X_{i,j}|^2$$

where X represents any block included in the difference image, i and j denote coordinate locations, and BS denotes a range of the block. If this sum is equal to or less than the threshold value, the meaningless area flag to the location of the block is sent to the smoother 106 and the variable-length encoder 116.

Further, for example, the meaningless area specifier 105 operates to derive an average of the difference values in the block. Then, a standard deviation dev of the difference values in the block is calculated on the following expression (17).

$$dev = \sum_{i,j \in BS} |\overline{X} - X_{i,j}| \tag{17}$$

or $$dev = \sum_{i,j \in BS} |\overline{X} - X_{i,j}|^2$$

If the standard deviation dev is equal to or less than a certain threshold value, the meaningless area flag at the block may be sent to the smoother 106 and the variable-length encoder 116. Or, after obtaining an average of the difference values inside of the block, the largest one of the deviations between the average value and the difference values within the block is derived. If the deviation is equal to or less than a certain threshold value, the meaningless area flag at the block is sent to the smoother 106 and the variable-length encoder 116. Or, two or more of the deviations of the difference values inside of the block from the average value may be estimated. Since the difference value and the standard deviation in the motionless block area are small, the foregoing estimating method may be used for specifying the motionless block area. The estimating method may employ another method.

Then, the wavelet converter 114 performs a wavelet conversion with respect to the difference value calculated by the subtracter 190. Further, the quantizer 115 operates to quantize a wavelet coefficient c obtained by the wavelet converter 14 by using a proper step size Q.

The wavelet coefficient quantized by the quantizer 115 is supplied to the variable-length encoder 116 and a de-quantizer 125. The de-quantizer 125 performs a de-quantizing operation with the same step size as that used in the quantizer 115. The de-quantized data is de-waveleted by the wavelet inverter 124 for restoring the difference value of the pixel value. The difference value of the pixel value restored by the wavelet inverter 124 is supplied to an adder 191 through the smoother 106.

The smoother 106 operates to smooth the object range of the image based on the location information LOCATION sent from the meaningless area specifier 105.

The difference value smoothed by the smoother 106 is added to the predicted value outputted from the motion compensator 103 through the effect of the adder 191. The added result is made to be the pixel value data, which is sent to the motion compensator 103 and then is stored in the frame memory (not shown). Then, the variable-length encoder 116 performs a variable-length encoding operation with respect to the location information LOCATION indicating the meaningless area of the difference value detected by the meaningless area specifier 105, the wavelet coefficient quantized by the quantizer 115, and a motion vector v detected by a vector detector 111 and then outputs the encoded result as a bit stream. The bit stream is sent to the decoder 200 shown in FIG. 9 through a storage medium 117 and a transmission path 118.

On the other hand, the decoder 200 shown in FIG. 9 receives the bit stream generated by the encoder 100. At first, a variable-length decoder 226 performs the reverse process to the variable-length encoder 116 located in the encoder 100 for restoring the location information LOCATION indicating the meaningless area of the difference value, the quantized wavelet coefficient, and the quantized motion vector v from the bit stream. The location information LOCATION is supplied to the smoother 206. The wavelet coefficient is supplied to a de-quantizer 225. The motion vector v is supplied to the motion compensator 203. The de-quantizer 225 and a wavelet inverter 224 are the same as those located in the encoder 100. The de-quantizer 225 and the wavelet inverter 224 perform the de-quantizing operation and the wavelet inverting operation with respect to the wavelet coefficient, for restoring the difference values of the pixel values.

The smoother 206 operates to smooth the difference values of the pixel values restored by the wavelet inverter 224 in the object area (block) of the image based on the location information LOCATION sent from the variable-length decoder 226.

Each of the difference values smoothed by the smoother 106 is added to the corresponding predicted value generated by the motion compensator 203 in advance through the effect of an adder 291. The added result is made to be the pixel value data, which re-composes the image inputted to the encoder 150 and then is outputted as a restored image. Further, each pixel value of the restored image is stored in the frame memory (not shown) provided in the motion compensator 203 for generating a predicted image.

The motion compensator 203 is the same as that located in the encoder 100. The motion compensator 203 operates to predict each pixel value of the image to be restored by using the motion vector v obtained by the variable-length decoder 226 and stored in the frame memory (not shown) provided in the motion compensator 203. Then, the predicted pixel values are supplied to the adder 291.

The foregoing description is concerned with the inter coding on the encoding side. If a large difference takes place between the pixel value to be encoded and the predicted value calculated by the motion compensator 203, the intra coding may be executed for preventing excessive increase of encoded bits. That is, the value derived by subtracting the average of the luminance values inside of the block from each pixel value inside of the block is sent as a difference image to the wavelet converter, and the average value (average offset value) of the luminance values is sent to the variable-length encoder 116 in place of the motion vector.

Figure 10:
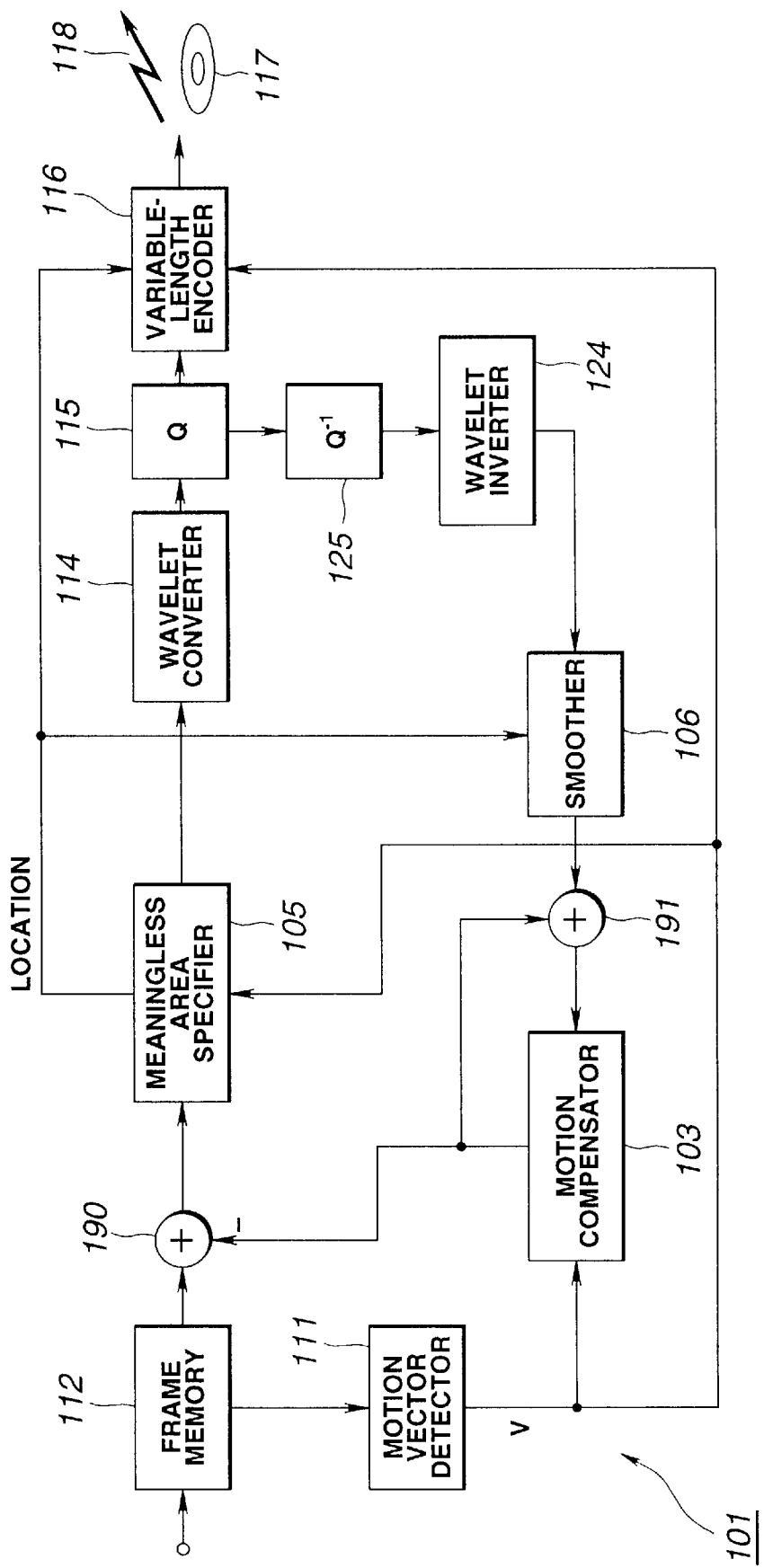
FIG. 10 is a block diagram showing another arrangement of an encoder for implementing a method for encoding an image according to the present invention.

The encoder 100 shown in FIG. 7 may take a method for estimating the vector v obtained by the vector detector 111 in place of the difference values inside of the block and the standard deviations of the difference values. That is, like the encoder 101 shown in FIG. 10, the vector obtained by the motion vector detector 111 is sent to the meaningless area specifier 105. If the magnitude of the vector is equal to or less than a certain threshold value, the meaningless area flag at the block is sent to the smoother 106 and the variable-length encoder 116.

Since the vector is made small on the motionless block area, the foregoing estimating method makes it possible to specify the motionless block area. Not only the vector v obtained by the motion vector detector 111 but another index obtained by another processor may be used.

Further, this estimating method may be combined with the estimating method for detecting the meaningless area included in the first embodiment. For example, the logical ORs or ANDs about these estimating methods are calculated so that those ORs or ANDs may be estimated. The estimating method indicated in the first embodiment may be reversed. For example, in the first embodiment, if the absolute value sum or the square sum of the deference value inside of the block is equal to or more than a certain threshold value, the block is regarded as a motion area, so that the meaningful area flag at the block is sent to the smoother 106 and the variable-length encoder 116. The smoother 106 operates to smooth the blocks except the meaningful areas.

The smoothers 106 and 206 perform the below-indicated smoothing operation, for example. These smoothers receive the meaningless area flag for the block consisting of 16 pixels in vertical and 16 pixels in horizontal sent from the meaningless area specifier 105 or the variable-length decoder 226 and forcibly replace all difference values with 0s in the range of the image corresponding to the block. Another type of smoothing may be selected except the forcible replacement of all the difference values with 0s.

This kind of arrangement makes it possible to specify the area at a block unit consisting of 16 pixels in vertical and 16 pixels in horizontal and use the same block as that used when detecting the motion vector, which thereby eliminates the necessity of allocating many bits to the shape. When dividing the difference image by the meaningless area specifier 105 and specifying the area, it is not always necessary to specify the area at that unit block. Any shape unit may be used for the specification.

Figure 11:
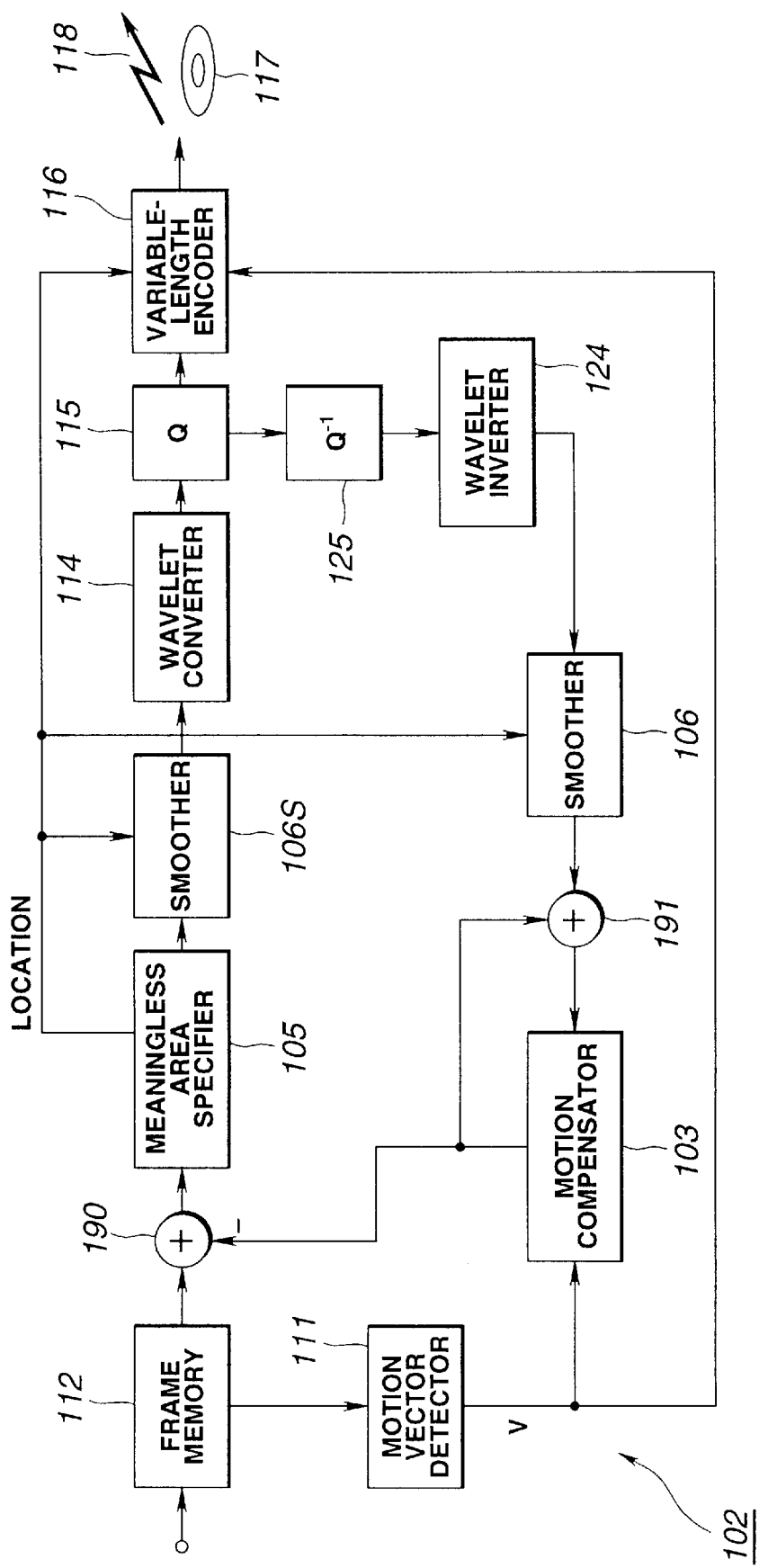
FIG. 11 is a block diagram showing another arrangement of an encoder for implementing a method for encoding an image according to the present invention.

Next, FIG. 11 shows an encoder 102 according to the second embodiment of the present invention. The encoder 102 has the substantially same basic arrangement as the encoder 100 shown in FIG. 7 according to the first embodiment, except that a second smoother 106S is located after the meaningless area specifier 105 of the encoder 100.

When the variable-length encoder 116 operates to encode a quantized wavelet coefficient, in general, the encoded bit train is made smaller as the coefficients of 0s are made greater in number. According to the second embodiment of the invention, by locating the smoother 106S before the wavelet converter 114, for example, the meaningless values are forcibly replaced with 0s, which leads to improving the encoding efficiency. The smoother 106S has the same arrangement of the smoother 106 included in the encoder according to the first embodiment.

Figure 12:
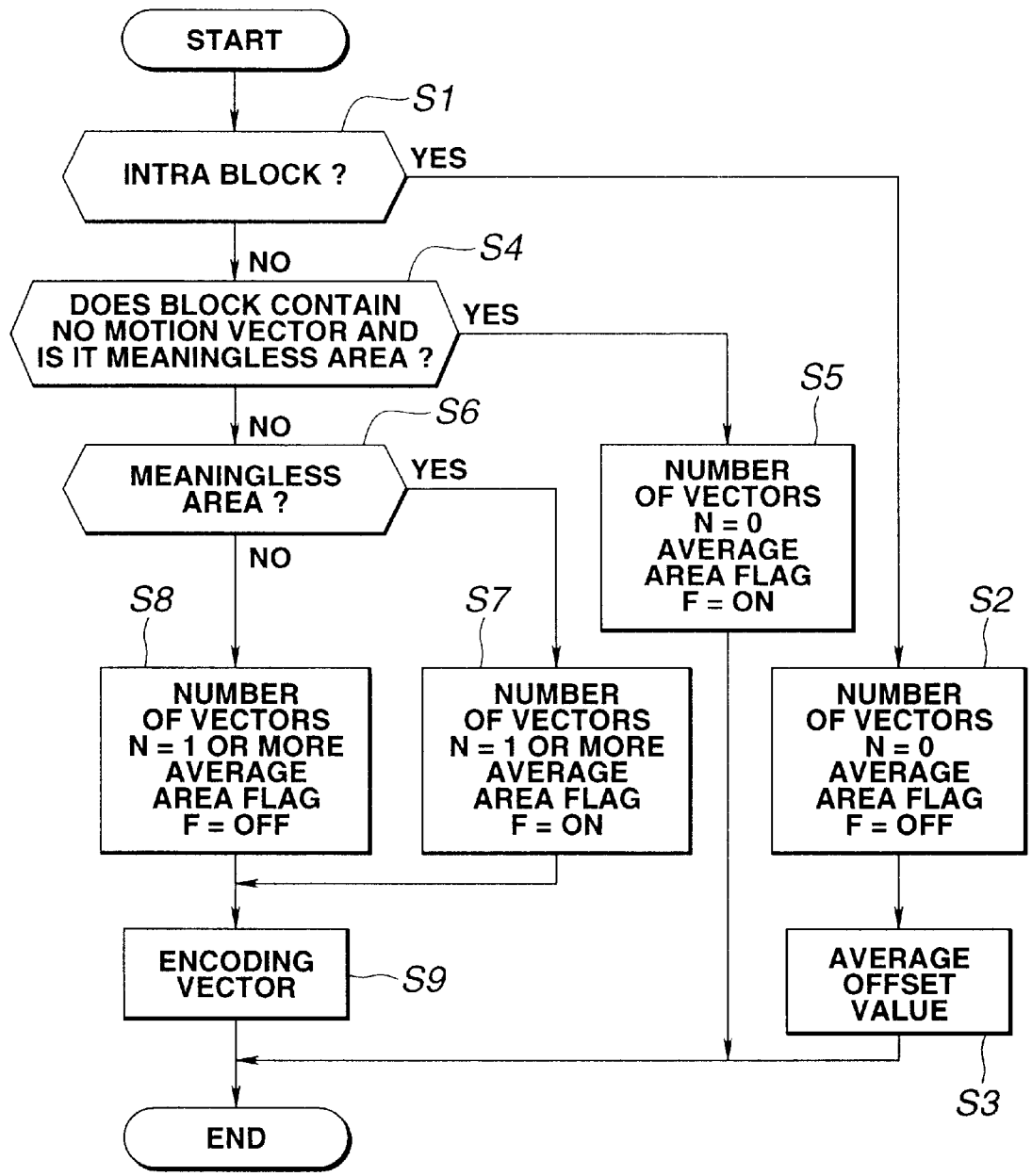
FIG. 12 is a flowchart showing a process for generating a encoded bit train executed in a method for encoding an image according to the present invention.

FIGS. 12 and 13 show generation of the encoded bit train of the present invention. In the third embodiment, about each block on which the motion vector is detected and the motion is compensated, the encoded bit train is composed as indicated below. This process corresponds to part of the process of the variable-length encoder.

At first, the description will be oriented to the output of the encoded vector or the average offset value in the generation of the encoded bit train. That is, as shown in the flowchart of FIG. 12, at a step S1, it is determined if the block of the data to be encoded is an intra block. If it is, the operation goes to a step S2 at which the number of vectors is set to zero and the meaningless area flag is set off. Then, at a step S3, the average of the luminance values inside of the block is outputted. This average is an average offset value.

If the block is any other except the intra block, the operation goes to a step S4 at which it is determined if the motion vector has a magnitude of zero and the block is meaningless. Then, if it is, at a step S5, the number of vectors is set to 0 and the meaningless area flag is set on. In this case, no further encoding is required. In the case of any other type of block except the conditioned block, the operation goes to a step S6 at which it is determined if the block belongs to the meaningless area. If it is, the operation goes to a step S7 at which the number of vectors is set to 1 or more and the meaningless area flag is set on. If not, the operation goes to a step S8 at which the number of vectors is set to 1 or more and the meaningless area flag is set off.

Then, after the meaningless area flags ON and OFF are outputted, the operation goes to a step S9 at which the encoded vector detected for the area is outputted.

The scanning sequence of the blocks is the same as that indicated by the arrow of FIG. 8. By using the foregoing grammar, it is possible to represent the location information of the meaningless area and the motion vector and the like detected for the area at a block unit.

Figure 6:
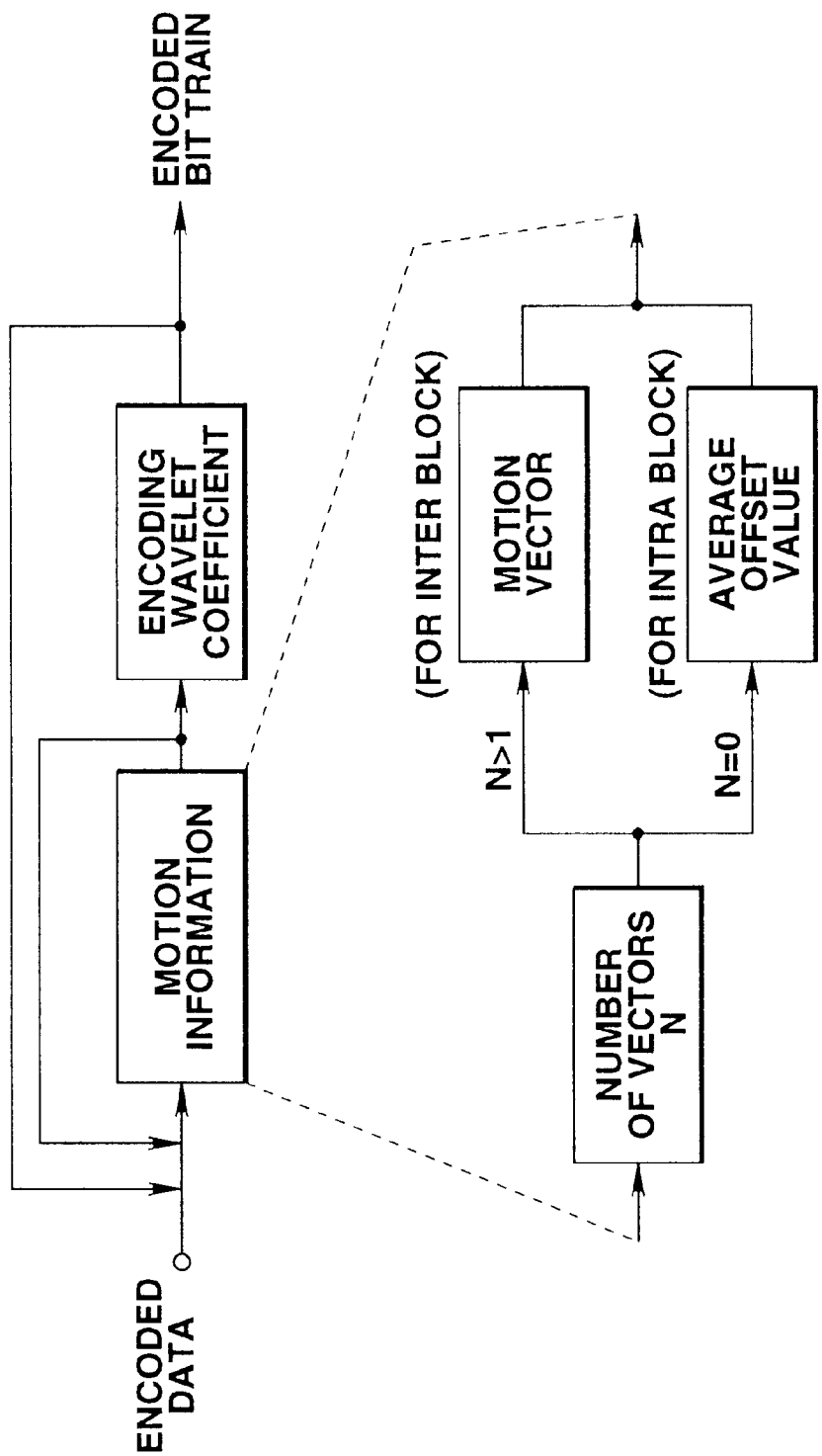
FIG. 6 is a multiplexing systematic diagram showing a grammatical structure used for generating an encoded bit train according to the present invention.
Figures 13A, 13B:
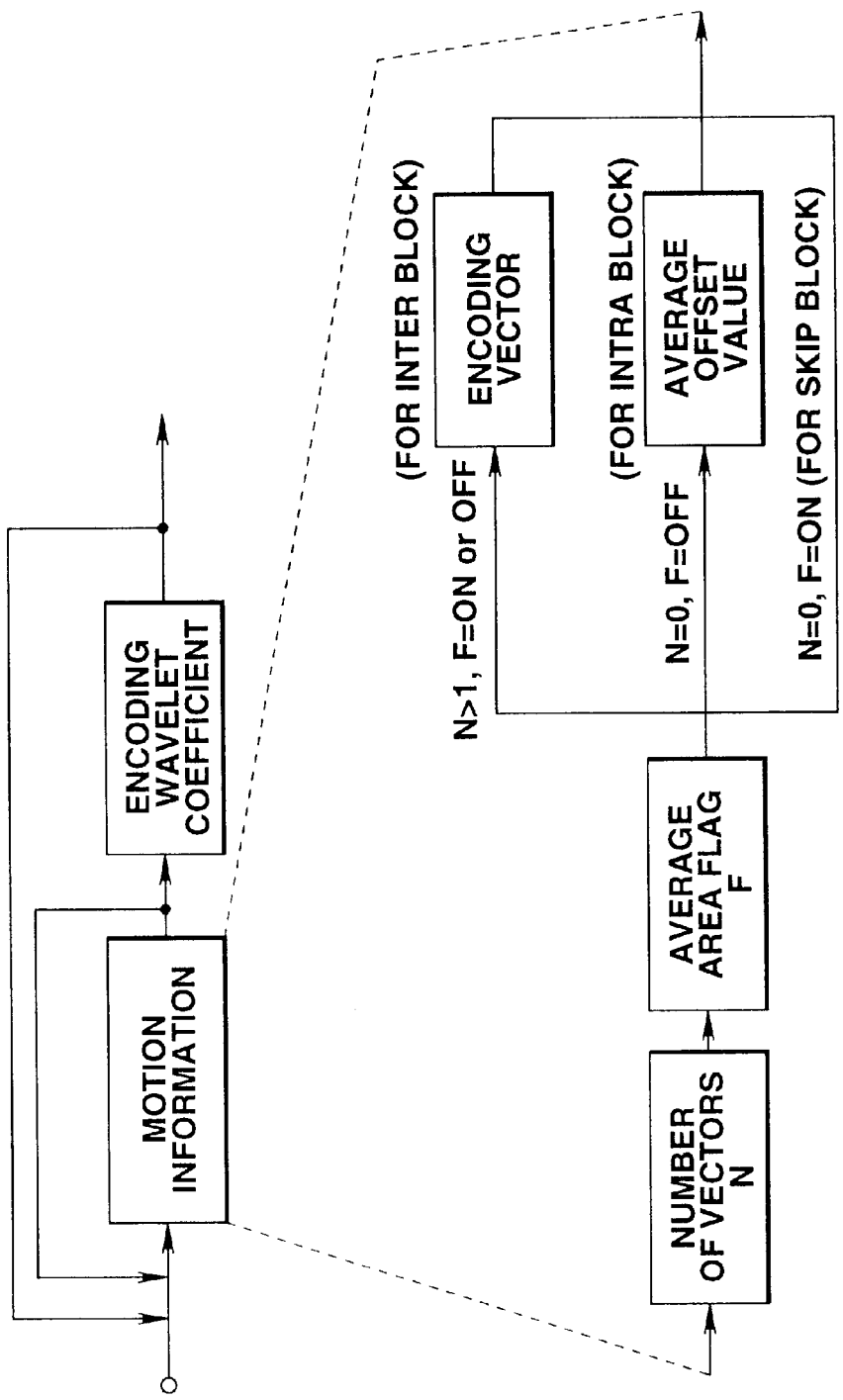
FIG. 13 is a multiplexing systematic diagram showing a grammatical structure used in generation of an encoded bit train executed in a method for encoding an image according to the present invention.

FIGS. 13A and 13B show the basic multiplexing systematic diagram showing the generation of the encoded bit train corresponding to the flowchart of FIG. 12. The systematic process is the substantially same as that shown in FIGS. 6A and 6B, except the meaning area flag for indicating whether or not the block is a meaningless area. If it is the meaningless area, the motion vector for the meaningless area may be unnecessary.

As set forth above, the present invention provides a capability of suppressing the diffusion of the quantizing noise components of the wavelet coefficients or the subband coefficients accompanied with the wavelet division, the subband division, and the quantization, thereby reducing the area where the ringing takes place.

Further, according to an embodiment of the invention, the hardware is implemented by using a block diagram. The present invention is not limited to it. It may be realized by the software with the CPU and the memory. Hence, the image encoding and/or image decoding algorithm according to the present invention may be realized by a computer program, that is, an image encoding program and/or image decoding program. In this case, the computer program is recorded in a recording medium such as a semiconductor memory or a disk when it is in use. Moreover, the image encoding program and/or image decoding program may be supplied to terminals and the like through a network.

The present invention may be modified in any form without having to depart from the spirit of the invention. Hence, the spirit of the invention is not limited to the foregoing embodiments.

What is claimed is:

1. An apparatus for encoding an input image signal, comprising:

means for detecting a motion vector from said input image signal;

means for operating a difference between said input image signal and a predicted image signal and outputting a difference image signal;

means for detecting a meaningless area from said difference image signal and outputting information indicating said meaningless area;

means for doing a subband conversion of said difference image signal and outputting a subband coefficient;

means for quantizing said subband coefficient and outputting said quantized subband coefficient;

means for de-quantizing said quantized subband coefficient and outputting a decoded subband coefficient;

means for doing a reverse subband conversion of said decoded subband coefficient and outputting a decoded difference image signal;

means for smoothing said decoded difference image signal based on said information indicating the meaningless area and outputting a smoothed decoded difference image signal;

means for adding said predicted image signal to said smoothed difference image signal and outputting a decoded image signal;

means for motion-compensating said decoded image signal with said motion vector and outputting said predicted image signal; and means for outputting said quantized subband coefficient, said information indicating the meaningless area, and said motion vector information as encoded data.

2. The image encoding apparatus as claimed in claim 1, wherein said subband conversion is wavelet conversion.

3. The image encoding apparatus as claimed in claim 1, further comprising:

means for smoothing said difference image signal based on said information indicating the meaningless area and outputting a smoothed difference image signal; and wherein said subband converting means performs a subband conversion of said smoothed difference image signal and outputs a subband coefficient.

4. The image encoding apparatus as claimed in claim 3, wherein said subband conversion is wavelet conversion.

5. The image encoding apparatus as claimed in claim 1, wherein said means for detecting said motion vector operates to detect a motion vector at a block unit, and said means for detecting said meaningless area operates to divide the difference image signal into the corresponding blocks to said block units and detect if each block is a meaningless area.

6. The image encoding apparatus as claimed in claim 3, wherein said means for detecting said meaningless area operates to output a one-bit flag for indicating if the block is a meaningless area as information for indicating the meaningless area.

7. The image encoding apparatus as claimed in claim 1, wherein said smoothing means operates to forcibly convert each value inside of the meaningless area into a given value based on said information for indicating the meaningless area, for outputting said smoothed decoded difference image signal.

8. The image encoding apparatus as claimed in claim 3, wherein said smoothing means operates to forcibly convert each difference value inside of the meaningless area into a given value based on the information for indicating said meaningless area, for outputting said smoothed difference image signal.

9. The image encoding apparatus as claimed in claim 1, wherein said means for detecting said meaningless area operates to generate an absolute value sum, a square sum or a standard deviation of said difference values inside of said area and compare said sum or deviation with a threshold value for determining if said area is the meaningless area.

10. The image encoding apparatus as claimed in claim 1, wherein said means for detecting the meaningless area operates to detect a maximum value of said difference values inside of said area and compare the maximum value with a threshold value, for determining if said area is the meaningless area.

11. The image encoding apparatus as claimed in claim 5, wherein said means for detecting said meaningless area operates to determine if the area is the meaningless area by compressing said motion vector detected for said area with a threshold value.

12. A method for encoding an input image signal, comprising the steps of:

detecting a motion vector from said input image signal;

operating a difference between said input image signal and a predicted image signal and outputting a difference image signal;

detecting a meaningless area from said difference image signal and outputting information indicating said meaningless area;

doing a subband conversion of said difference image signal and outputting a subband coefficient;

quantizing said subband coefficient and outputting said quantized subband coefficient;

de-quantizing said quantized subband coefficient and outputting a decoded subband coefficient;

doing a reverse subband conversion of said decoded subband coefficient and outputting a decoded difference image signal;

smoothing said decoded difference image signal based on said information indicating the meaningless area and outputting a smoothed decoded difference image signal;

adding said predicted image signal to said smoothed difference image signal and outputting a decoded image signal;

motion-compensating said decoded image signal with said motion vector and outputting said predicted image signal; and outputting said quantized subband coefficient, said information indicating the meaningless area, and said motion vector information as encoded data.

13. The image encoding method as claimed in claim 12, wherein said subband conversion is wavelet conversion.

14. The image encoding method as claimed in claim 12, further comprising the step of:

smoothing said difference image signal based on said information indicating the meaningless area and outputting a smoothed difference image signal; and wherein at said subband converting step, an operation is executed to do subband conversion of said smoothed difference image signal and output a subband coefficient.

15. The image encoding method as claimed in claim 14, wherein said subband conversion is wavelet conversion.

16. The image encoding method as claimed in claim 12, wherein at said step of detecting said motion vector, an operation is executed to detect a motion vector at a block unit, and at said step of detecting said meaningless area, an operation is executed to divide the difference image signal into the corresponding blocks to said block units and detect if each block is a meaningless area.

17. The image encoding method as claimed in claim 14, wherein at said step of detecting said meaningless area, an operation is executed to output a one-bit flag for indicating if the block is a meaningless area as information for indicating the meaningless area.

18. The image encoding method as claimed in claim 12, wherein at said smoothing step, an operation is executed to forcibly convert each value inside of the meaningless area into a given value based on said information for indicating the meaningless area, for outputting said smoothed decoded difference image signal.

19. The image encoding method as claimed in claim 14, wherein at said smoothing step, an operation is executed to forcibly convert each difference value inside of the meaningless area into a given value based on the information for indicating said meaningless area, for outputting said smoothed difference image signal.

20. The image encoding method as claimed in claim 12, wherein at said step of detecting said meaningless area, an operation is executed to generate an absolute value sum, a square sum or a standard deviation of said difference values inside of said area and compare said sum or deviation with a threshold value for determining if said area is the meaningless area.

21. The image encoding method as claimed in claim 12, wherein at said step of detecting the meaningless area, an operation is executed to detect a maximum value of said difference values inside of said area and compare the maximum value with a threshold value, for determining if said area is the meaningless area.

22. The image encoding method as claimed in claim 16, wherein at said step of detecting said meaningless area, an operation is executed to determine if the area is the meaningless area by comparing said motion vector detected for said area with a threshold value.

23. An image decoding apparatus for receiving encoded data and decoding said encoded data, said encoded data containing a quantized subband coefficient information indicating a meaningless area, and motion vector information, comprising:

means for de-quantizing said quantized subband coefficient and outputting a decoded subband coefficient;

means for inverting said decoded subband coefficient and outputting a decoded difference image signal;

means for smoothing said decoded difference image signal based on said information for indicating the meaningless area and outputting a smoothed decoded difference image signal;

means for adding a predicted image signal to said smoothed difference image signal and outputting a decoded image signal; and means for motion-compensating said decoded image signal with said motion vector and outputting said predicted image signal.

24. The image decoding apparatus as claimed in claim 23, wherein said subband conversion is wavelet conversion.

25. The image decoding apparatus as claimed in claim 23, wherein said motion vector is detected at a block unit, and said information indicating the meaningless area is detected at said block unit.

26. The image decoding apparatus as claimed in claim 25, wherein said information indicating the meaningless area is a one-bit flag for indicating if the block is the meaningless area.

27. The image decoding apparatus as claimed in claim 23, wherein said smoothing means operates to forcibly convert each value inside of the meaningless area into a given value based on said information indicating the meaningless area, for outputting said smoothed decoded difference image signal.

28. An image decoding method for receiving encoded data and decoding said encoded data, said encoded data containing a quantized subband coefficient information indicating a meaningless area, and motion vector information, comprising the steps of:

de-quantizing said quantized subband coefficient and outputting a decoded subband coefficient;

inverting said decoded subband coefficient and outputting a decoded difference image signal;

smoothing said decoded difference image signal based on said information for indicating the meaningless area and outputting a smoothed decoded difference image signal;

adding a predicted image signal to said smoothed difference image signal and outputting a decoded image signal; and motion-compensating said decoded image signal with said motion vector and outputting said predicted image signal.

29. The image decoding method as claimed in claim 28, wherein said subband conversion is wavelet conversion.

30. The image decoding method as claimed in claim 28, wherein said motion vector is detected at a block unit, and said information indicating the meaningless area is detected at said block unit.

31. The image decoding method as claimed in claim 30, wherein said information indicating the meaningless area is a one-bit flag for indicating if the block is the meaningless area.

32. The image decoding method as claimed in claim 28, wherein at said smoothing step, an operation is executed to forcibly convert each value inside of the meaningless area into a given value based on said information indicating the meaningless area, for outputting said smoothed decoded difference image signal.

33. A recording medium to be decoded by a decoding apparatus, having encoded data, said encoded data containing a quantized subband coefficient, information indicating a meaningless area, and motion vector information, said encoded data generated by the steps of:

detecting a motion vector from an input image signal;

operating a difference between said input image signal and a predicted image signal and outputting said difference image signal;

detecting a meaningless area from said difference image signal and outputting said information indicating the meaningless area;

subband-convert said difference image signal and outputting a subband coefficient;

quantizing said subband coefficient and outputting said quantized subband coefficient;

de-quantizing said quantized subband coefficient and outputting a decoded subband coefficient;

inverting said decoded subband coefficient for outputting a decoded difference image signal;

smoothing said decoded difference image signal based on said information indicating the meaningless area and outputting a smoothed decoded difference image signal;

adding said predicted image signal to said smoothed difference image signal, outputting a decoded image signal, motion-compensating said decoded image signal with said motion vector, and outputting said predicted image signal; and outputting said quantized subband coefficient, said information indicating the meaningless area, and said motion vector information as encoded data.

34. The image recording medium as claimed in claim 33, wherein said subband conversion is wavelet conversion.

* * * * *